Oct. 5, 1954 R. ADLER 2,691,117

ELECTRON-DISCHARGE DEVICE

Filed March 19, 1952 2 Sheets-Sheet 1

INVENTOR:
ROBERT ADLER
BY Francis W. Crotty
HIS ATTORNEY.

Oct. 5, 1954

R. ADLER 2,691,117

ELECTRON-DISCHARGE DEVICE

Filed March 19, 1952

2 Sheets-Sheet 2

INVENTOR:
ROBERT ADLER
BY Francis W. Crotty
HIS ATTORNEY.

Patented Oct. 5, 1954 2,691,117

UNITED STATES PATENT OFFICE 2,691,117

ELECTRON-DISCHARGE DEVICE

Robert Adler, Northfield, Ill., assignor to Zenith Radio Corporation, a corporation of Illinois Application March 19, 1952, Serial No. 277,399

19 Claims. (Cl. 313—80)

This invention relates to electron-discharge devices and more particularly to such devices employing deflection control, commonly known as beam deflection tubes.

There are numerous applications in which the use of a beam deflection tube is particularly attractive due to certain of its characteristic properties such as its adaptability to balanced operation and its potentially high input impedance for input signals within a substantial amplitude range including positive input potentials. However, considerable difficulty has been encountered with deflection-control systems in applications wherein the input signal amplitude may vary between wide limits. In such applications, a compromise must be struck between close spacing of the deflection electrodes to obtain high deflection sensitivity and wide spacing of these electrodes to maintain a high input impedance throughout a wide range of signal amplitudes. In consequence, the electrostatic beam deflection system is not used in most commercial circuit applications, even though some of these applications are inherently adapted to balanced operation with a deflection-control arrangement.

It is a primary object of the present invention to provide a new and improved beam deflection tube having a high input impedance over a wide range of input signal amplitudes without substantial sacrifice in deflection sensitivity.

It is a further object of the invention to provide a new and improved electrostatic deflection electrode for a beam deflection tube.

In accordance with a feature of the present invention, a new and improved beam deflection tube comprises an electron gun for projecting a focused electron beam along a predetermined axis. Means including a pair of electrostatic-deflection electrodes disposed on opposite sides of the axis are provided for normally directing the beam along a predetermined mean path and, in response to an applied input signal, for deflecting the beam transversely away from the mean path. At least one of the deflection electrodes comprises a plurality of electrically interconnected separated conductive vanes individually intersecting a median plane through the vanes at an acute angle and collectively having a substantially continuous projected area on the mean path. An output electrode system effectively intercepting the mean path is also provided.

In accordance with another feature of the invention, a new and improved electrostatic-deflection electrode for a beam deflection tube comprises a plurality of electrically interconnected separated conductive vanes each substantially tangent to rays originating at a common point.

The features of the present invention which are believed to be novel are set forth with particularity in the appended claims. The invention, together with further objects and advantages thereof, may best be understood, however, by reference to the following description taken in connection with the accompanying drawings, in the several figures of which like reference numerals indicate like elements, and in which:

Figure 1:
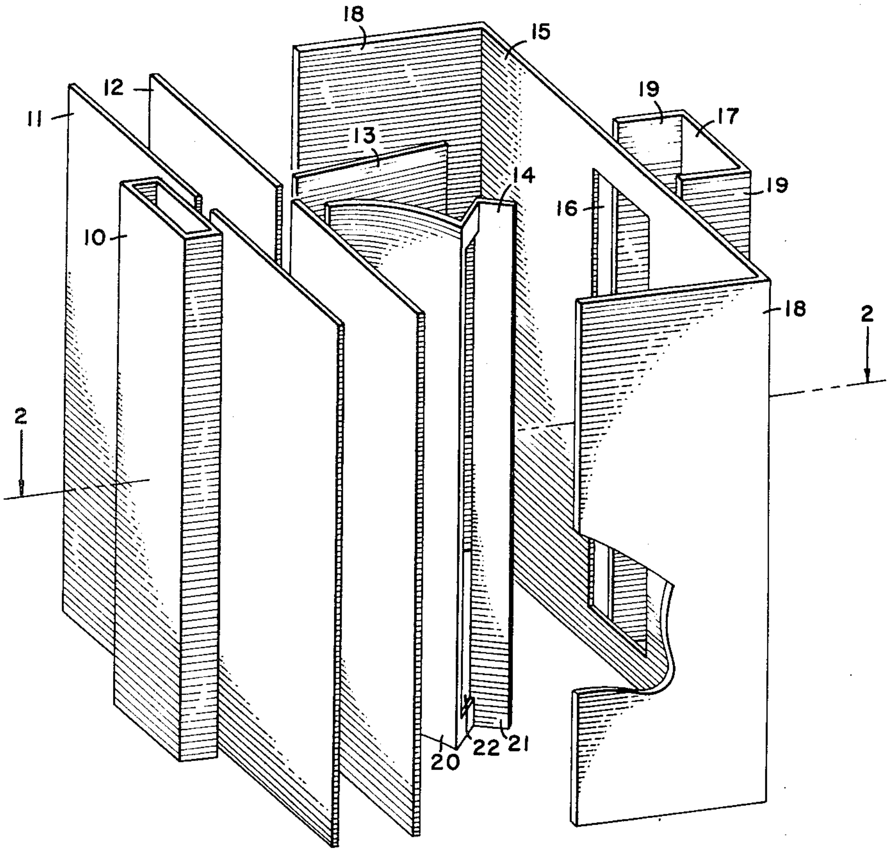
Figure 1 is a perspective view of the electrode system of a beam deflection tube constructed in accordance with the present invention.

As shown in the perspective view of Figure 1, the electrode system of a beam deflection tube embodying the present invention comprises an elongated cathode 10, a slotted focusing electrode 11, and a slotted accelerating electrode 12 which together constitute an electron gun for projecting a sheet-like electron beam of substantially rectangular cross-section along a predetermined axis. A pair of electrostatic-deflection electrodes 13 and 14 are disposed on opposite sides of the axis and constitute a deflection-control system for normally directing the beam along a predetermined mean path, which may coincide with the axis along which the electron beam is initially projected, and, in response to an applied input signal, for transversely deflecting the beam away from the mean path. An output electrode system, comprising an intercepting electrode or target electrode 15 having a slot 16 followed by a final anode 17, effectively intercepts the mean path of the beam. Target electrode 15 and final anode 17 are provided with flanges 18 and 19, respectively, extending toward the electron gun for the purpose of providing well-defined boundary potentials.

Figure 3:
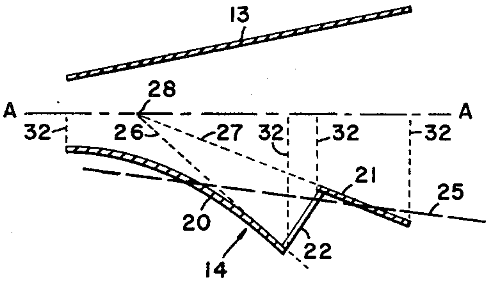
Figure 3 is an enlarged cross-sectional view of the deflection-control system of the device of Figures 1 and 2.

The electrode construction of Figure 1 is entirely conventional with the exception of electrostatic-deflection electrode 14. In accordance with the present invention, deflection electrode 14 comprises a pair of conductive vanes 20 and 21 which are disposed in spaced planes and are electrically interconnected preferably by being formed from a unitary piece of metal which is slotted as indicated at 22 and bent to the desired configuration. The construction and operation of deflection electrode 14 will be more fully described in connection with Figure 3.

The electrode system is supported within a suitable envelope (not shown), preferably a conventional miniature tube envelope, which is subsequently evacuated and gettered in any manner known in the art.

Figure 2:
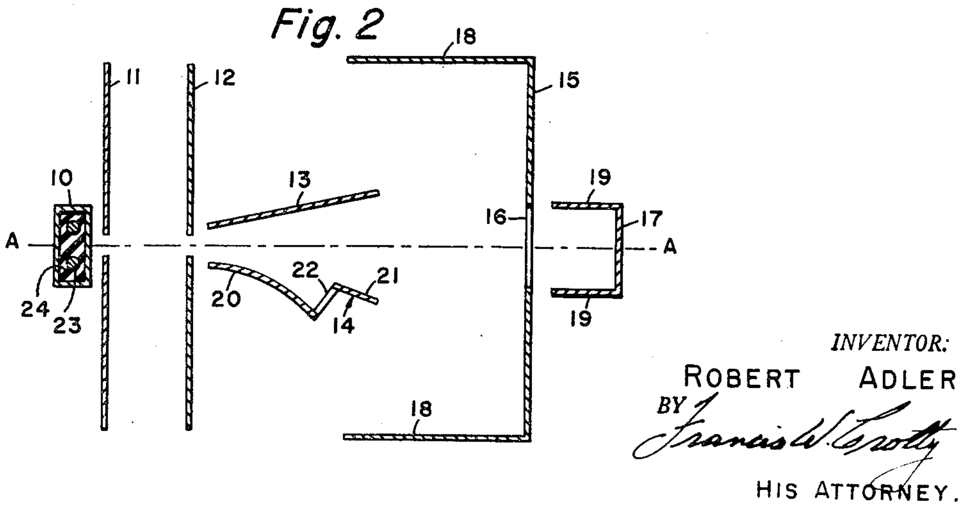
Figure 2 is a cross-sectional view taken along the line 2—2 of Figure 1.

The structure of the electrode system is illustrated in cross-section in the view of Figure 2. Cathode 10 is provided with an indirect-heater element 23 which is imbedded in insulating material 24 supported within the cathode sleeve. Additional modifications of the electrode system may be made, as by adding additional electrodes or changing the form of the electron gun or the output electrode system, without departing from the spirit of the present invention. Further, electrostatic-deflection electrode 13 may be formed in a manner similar to deflection electrode 14 if desired. Moreover, while the present invention offers particular advantages in connection with a beam deflection tube employing a sheet-like electron beam of rectangular cross-section, the advantages of the invention may in general be obtained in any type of electron-discharge device employing a focused electron beam subjected to electrostatic-deflection control.

In operation, space electrons originating at the emissive surface of cathode 10 are formed into a focussed electron beam which is projected along a predetermined axis A—A between electrostatic-deflection electrodes 13 and 14. The mean path of the beam from the effective center of deflection onward toward the final output electrode system may be controlled by varying the potential difference between electrostatic-deflection electrodes 13 and 14. If the bias potentials of these electrodes are substantially equal, the mean path of the beam as it proceeds toward the output electrode system coincides substantially with the original beam axis A—A, and operation in this manner has been indicated in the drawings for purposes of convenience; however, it may be desirable under certain circumstances to operate the deflection-control system under such bias conditions that the mean path of the beam leaving the deflection-control field is displaced from the original beam axis A—A, and an arrangement of this type is within the scope of the present invention.

When signal voltages having alternating components are applied to one or both of the deflection-control electrodes 13 and 14, the beam is transversely deflected from its mean path in accordance with the deflection field established by the applied input signal. To obtain the advantages of the invention, the electrostatic-deflection electrode 14 of special construction is employed as the active deflector or the one to which the input signal is applied; if a balanced input signal is to be applied between electrodes 13 and 14, both electrodes are preferably constructed in the manner described in connection with electrode 14.

With the exception of the particular construction of one or both of the electrostatic-deflection electrodes, the beam deflection tube illustrated in Figures 1 and 2 is of entirely conventional construction. In a conventional beam deflection tube, however, both electrostatic-deflection electrodes are constructed as solid plates in the manner of electrode 13 in the illustrated embodiment. With such an arrangement, it has been found that, for input signal amplitudes above a relatively small range, substantial beam current is drawn by one or both deflectors, resulting in an effective compression of the applied input signal and a consequent distortion and decrease in gain. This effect is particularly troublesome in applications wherein a relatively complex input signal having pulse components, such as a composite video signal, is applied to one or both deflectors as the input or controlling signal, since substantially only the synchronizing-pulse components result in increased deflector current and are therefore compressed to a greater extent than the video-signal components of lower amplitude. Such compression of the synchronizing-pulse components renders separation of the synchronizing pulses from the video-signal components difficult and unreliable.

Viewed in another way, it is desirable to space the opposing deflection-control electrodes as closely as possible in order to retain optimum deflection sensitivity. However, the closer the spacing, the smaller the input signal amplitude range which may be accommodated without drawing excessive input deflector current. In conventional beam deflection tubes of the prior art, it has always been necessary to strike a compromise between these two incompatible conditions.

In accordance with the present invention, the advantage of high deflection sensitivity is retained without sacrifice in the range of input signal amplitudes which may be accommodated without drawing excessive input deflector current; indeed, this input signal amplitude range is even materially increased while retaining high deflection sensitivity. The manner in which this desired objective is achieved by the special construction of input deflector 14 is apparent from a consideration of the fragmentary cross-sectional view of Figure 3, in which only the deflection-control system and the beam axis A—A are represented. As previously mentioned, input deflector 14 comprises a pair of conductive vanes 20 and 21 which are electrically interconnected and thereby maintained at a common operating potential at all times. Each of the vanes 20 and 21 intersects a median plane indicated by the dashed line 25, passing through the geometrical centers of the vanes, at an acute angle, diverging from the mean path A—A of the beam in the direction of electron travel, and each of the vanes is substantially tangent to rays 26 and 27 originating at a common point 28 in the reference plane A—A, corresponding to the effective center of deflection of the control system comprising electrodes 13 and 14. Preferably, vane 20 is curved outwardly from the tube axis in the direction of electron travel, while vane 21 is substantially flat and is positioned closer to the tube axis than the end of vane 20 most remote from the electron source. With the illustrated construction, it is preferred that the companion deflector 13 be maintained at a suitable constant bias potential, preferably positive with respect to that of the cathode, and that a single-ended input signal be applied to active deflector 14.

Figure 4:
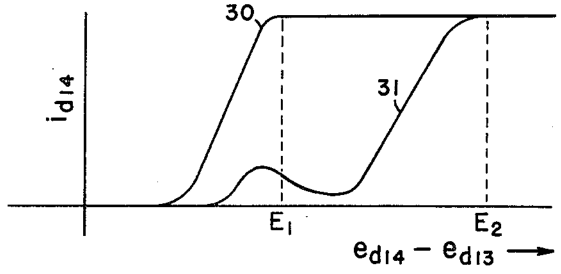
Figure 4 is a graphical representation illustrating an operating characteristic of the device of Figures 1 and 2.

With a conventional beam deflection tube of the type employing solid flat or planar deflection electrodes, the beam current drawn by the active deflector increases with increase in input signal amplitude in the manner illustrated by curve 30 of Figure 4, wherein the active deflector current $i_{d14}$ is plotted as a function of the potential difference $e_{d14}-e_{d13}$ between the active deflector and the companion deflector. Over a narrow range of input signal amplitudes, no current is drawn by the active deflector. As the input signal further increases in amplitude, the active deflector current rises and attains a saturation value corresponding to full beam current at a predetermined input signal amplitude $E_1$. Further increase in input signal amplitude has no substantial effect on the active deflector current.

When the active deflector is constructed in accordance with the present invention, the active deflector starts drawing beam current when the input signal amplitude is sufficient to cause the beam to graze the surface of vane 21. Further increase in the signal amplitude, however, causes the beam to be deflected through slot 22 between conductive vanes 20 and 21 with the result that the current drawn by the active deflector decreases over a substantial further range of input signal amplitudes. Eventually, with input signals of much higher amplitude, the beam is deflected against vane 20, and the active deflector current increases to a saturation value at an input signal amplitude $E_2$ much greater than the voltage $E_1$ at which saturation current is drawn by a conventional input deflector. The operating characteristic of the system of the present invention is represented by curve 31 of Figure 4, which is plotted on the same scale as curve 30.

It is apparent from a comparison of operating characteristics 30 and 31 that the construction of the present invention permits operation of the tube over a much wider range of input signal amplitudes without drawing excessive active deflector current than conventional beam deflection tubes of the prior art. At the same time, this advantage is achieved without substantial sacrifice in deflection sensitivity by virtue of the particular construction described, since the projected area of the conductive vanes on the reference plane or beam axis A—A is substantially continuous and coextensive with that of the solid companion deflector 13, as indicated by dotted lines 32, and the electrostatic deflection field established between deflectors 13 and 14 is very similar to that which would be produced if deflector 14 were formed as a solid flat plate located in median plane 25.

In the illustrated embodiment, the active deflector is formed of a pair of conductive vanes, one curved and one flat or planar, disposed in spaced planes and electrically interconnected for operation at a common potential at all times. It is apparent that the invention is not restricted to a deflection electrode employing two such conductive vanes, and three or more such vanes may be employed if desired. In any event, each of the vanes must intersect a median plane through the centers of the vanes at an acute angle and each must diverge outwardly from the beam axis in the direction of electron travel. Moreover, it is preferable that each of the vanes be substantially tangent to rays originating at a common point corresponding to the effective center of deflection of the control system.

Figure 5:
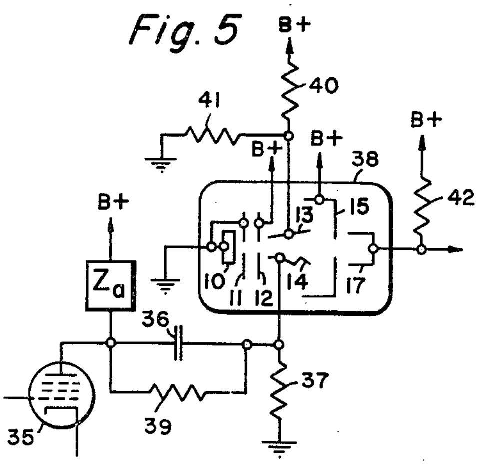
Figure 5 is a schematic diagram of a circuit employing the device of Figures 1 and 2.

A beam deflection tube incorporating the present invention may be employed to advantage in numerous known systems. Merely by way of illustration and in no sense by way of limitation, a tube of the type shown in Figures 1 and 2 may be employed in a synchronizing-signal separator circuit for a television receiver, as illustrated in the fragmentary schematic view of Figure 5. In Figure 5, amplified composite video signals from the load impedance $Z_a$ of the first video amplifier 35 are applied by means of a coupling condenser 36 and an input resistor 37 to active deflector 14 of a beam deflection tube 38 constructed in the manner shown and described in connection with Figures 1 and 2, with the synchronizing-pulse components positively oriented with respect to the video-signal components. Active deflector 14 is maintained at a suitable positive operating bias potential relative to cathode 10 by means of a voltage divider connected between a suitable source of positive unidirectional operating potential, conventionally designated B+, and ground and comprising the load impedance $Z_a$ associated with video amplifier 35, a resistor 39 connected in parallel with coupling condenser 36, and resistor 37. Cathode 10 and focusing electrode 11 may be directly connected to ground, while accelerating electrode 12 and slotted target electrode 15 may be directly connected to B+. Companion deflector 13 is maintained at a suitable positive bias potential relative to cathode 10 by means of a voltage divider connected between B+ and ground and comprising resistors 40 and 41. Output anode 17 is connected to B+ through a load resistor 42.

In operation, the bias potentials of deflectors 13 and 14 are so adjusted that the beam is intercepted by the solid portion of target electrode 15 during video signal intervals. However, the synchronizing-pulse components, being of greater amplitude than the video-signal components, cause deflection of the beam into slot 16 of target electrode 15, thus establishing current pulses to anode 17 which correspond to the synchronizing-pulse components of the input signal. Corresponding voltage pulses are developed across load resistor 42 and translated to the conventional scanning circuits (not shown) to effect scanning synchronism.

The present invention may also be applied with advantage to special-purpose beam deflection tubes, as for example those shown and claimed in the following copending applications: Serial No. 242,509, filed August 18, 1951, in the name of Robert Adler for "Television Receiver," Serial No. 246,768, filed September 15, 1951, in the name of John G. Spracklen for "Television Receiver," Serial No. 272,200, filed Feburary 18, 1952, in the name of Robert Adler for "Television Receiver," and Serial No. 263,737, filed December 28, 1951, in the name of Robert Adler for "Electron-Discharge Device," all of which are assigned to the present assignee.

Thus the present invention provides a new and improved beam deflection tube in which excessive input deflector current with high input signal amplitudes is avoided without substantial sacrifice in deflection sensitivity. This desirable objective is achieved by a simple modification in the construction of the active or input deflector and, consequently, the improved operation is achieved without substantial increase in tube cost.

While a particular embodiment of the present invention has been shown and described, it is apparent that various changes and modifications may be made, and it is therefore contemplated in the appended claims to cover all such changes and modifications as fall within the true spirit and scope of the invention.

I claim:

1. A beam deflection tube comprising: an electron gun for projecting a focused electron beam along a predetermined axis; means including a deflection-control system comprising a pair of electrostatic-deflection electrodes disposed on opposite sides of said axis for normally directing said beam along a predetermined mean path and responsive to an applied input signal for deflecting said beam transversely away from said mean path, at least one of said electrodes comprising a plurality of electrically interconnected separated control portions having surfaces disposed in spaced planes substantially tangent to respective deflected paths of said beam; and an output system effectively intersecting said mean path.

2. A beam deflection tube comprising: an electron gun including an elongated cathode for projecting a sheet-like electron beam of substantially rectangular cross-section along a predetermined axis; a deflection-control system comprising a pair of electrostatic-deflection electrodes disposed on opposite sides of said axis for normally directing said beam along a predetermined mean path and responsive to an applied input signal for deflecting said beam transversely away from said mean path, at least one of said electrodes comprising a plurality of electrically interconnected separated conductive vanes individually intersecting a median plane through said vanes at an acute angle and collectively having a substantially continuous projected area on said mean path; and an output system effectively intercepting said mean path.

3. A beam deflection tube comprising: an electron gun including an elongated cathode for projecting a sheet-like electron beam of substantially rectangular cross-section along a predetermined axis; a deflection-control system comprising a pair of electrostatic-deflection electrodes disposed on opposite sides of said axis for normally directing said beam along a predetermined mean path and responsive to an applied input signal for deflecting said beam transversely away from said mean path, at least one of said electrodes comprising a plurality of electrically interconnected separated conductive vanes individually substantially tangent to respective deflected paths of said beam and collectively having a substantially continuous projected area on said mean path; and an output system effectively intercepting said mean path.

4. A beam deflection tube comprising: an electron gun including an elongated cathode for projecting a sheet-like electron beam of substantially rectangular cross-section along a predetermined axis; a deflection-control system comprising a pair of divergent electrostatic-deflection electrodes disposed on opposite sides of said axis for normally directing said beam along a predetermined mean path and responsive to an applied input signal for deflecting said beam transversely away from said mean path, at least one of said electrodes comprising a plurality of electrically interconnected separated conductive vanes individually substantially tangent to respective deflected paths of said beam and collectively having a substantially continuous projected area on said mean path, said vanes each intersecting a median plane through said vanes at an acute angle; and an output system effectively intercepting said mean path.

5. In combination: a beam deflection tube comprising an electron gun for projecting a focused electron beam along a predetermined axis, means including a deflection-control system comprising a pair of electrostatic-deflection electrodes disposed on opposite sides of said axis for normally directing said beam along a predetermined mean path and responsive to an applied input signal for deflecting said beam transversely away from said path, at least one of said electrodes comprising a plurality of electrically interconnected separated conductive vanes individually substantially tangent to respective deflected paths of said beam and collectively having a substantially continuous projected area on said mean path, and an output electrode system effectively intersecting said mean path; and an input-signal source coupled to said one electrostatic-deflection electrode.

6. A beam deflection tube comprising: an electron gun for projecting an electron beam along a predetermined axis; and a deflection-control system including an electrostatic-deflection electrode transversely spaced from said axis and comprising a plurality of separated electrically interconnected conductive vanes individually intersecting a median plane through said vanes at an acute angle and collectively having a substantially continuous projected area on said axis.

7. A beam deflection tube comprising: an electron gun for projecting an electron beam along a predetermined axis; and a deflection-control system including an electrostatic-deflection electrode transversely spaced from said axis and comprising a plurality of separated electrically interconnected conductive vanes individually intersecting a median plane through said vanes at an acute angle and collectively having a substantially continuous projected area on said axis, said median plane intersecting said axis at an acute angle.

8. In combination: an electron gun for projecting an electron beam along a predetermined axis; a deflection-control system including an electrostatic-deflection electrode transversely spaced from said axis and comprising a plurality of separated electrically interconnected conductive vanes individually intersecting a median plane through said vanes at an acute angle and collectively having a substantially continuous projected area on said axis; an output electrode system effectively intersecting said axis; and means for applying an input signal to said electrostatic-deflection electrode.

9. A beam deflection tube comprising: an electron gun for projecting an electron beam along a predetermined axis; and a deflection-control system including an electrostatic-deflection control electrode transversely spaced from said axis and comprising a curved conductive vane and a flat conductive vane individually intersecting a median plane through said vanes at an acute angle and collectively having a substantially continuous projected area on said axis; and means electrically interconnecting said conductive vanes.

10. In combination: an electrostatic-deflection electrode comprising a plurality of separated electrically interconnected conductive vanes individually intersecting a median plane through said vanes at an acute angle and collectively having a substantially continuous projected area on a reference plane intersecting said median plane at an acute angle; and means for projecting a focused electron beam in said reference plane.

11. In combination: an electrostatic-deflection electrode comprising a plurality of separated electrically interconnected conductive vanes individually intersecting a median plane through said vanes at an acute angle and collectively having a substantially continuous projected area on a reference plane intersecting said median plane at an acute angle, said vanes individually being substantially tangent to rays originating at a predetermined reference point in said reference plane; and an electron gun including an elongated cathode for projecting a sheet-like electron beam of substantially rectangular cross-section along said reference plane.

12. An electrostatic-deflection electrode for a beam deflection tube comprising a plurality of separated electrically interconnected conductive vanes individually intersecting a median plane through said vanes at an acute angle and collectively having a substantially continuous projected area on a reference plane intersecting said median plane at an acute angle, at least one of said vanes having a curved surface diverging outwardly from said reference plane with respect to the intersection of said planes.

13. An electrostatic-deflection electrode for a beam deflection tube comprising a curved conductive vane and a flat conductive vane individually intersecting a median plane through said vanes at an acute angle and collectively having a substantially continuous projected area on a reference plane intersecting said median plane at an acute angle, and means electrically interconnecting said vanes.

14. An electrostatic-deflection electrode for a beam deflection tube comprising a plurality of separated electrically interconnected conductive vanes individually intersecting a median plane through said vanes at an acute angle and collectively having a substantially continuous projected area on a reference plane intersecting said median plane at an acute angle, said vanes individually being substantially tangent to rays originating at a predetermined reference point in said reference plane.

15. An electrostatic-deflection electrode for a beam deflection tube comprising a plurality of separated electrically interconnected conductive vanes individually intersecting a median plane through said vanes at an acute angle and collectively having a substantially continuous projected area on a reference plane intersecting said median plane at an acute angle, said vanes individually being substantially tangent to rays originating at a predetermined reference point within said projected area.

16. In combination: a beam deflection tube comprising an electrostatic-deflection electrode including a plurality of separated electrically interconnected conductive vanes each intersecting a median plane through said vanes at an acute angle; and an input-signal source coupled to said electrostatic-deflection electrode.

17. In combination: a beam deflection tube comprising an electrostatic-deflection electrode including a plurality of separated electrically interconnected conductive vanes individually substantially tangent to rays originating at a common point; and an input-signal source coupled to said electrostatic-deflection electrode.

18. A beam deflection tube comprising: an electron gun including an elongated cathode for projecting a sheet-like electron beam of substantially rectangular cross-section along a predetermined axis; a first beam deflection electrode transversely spaced from said axis and having a predetermined projected area on said axis; and an additional beam deflection electrode transversely spaced from said axis opposite said first beam deflection electrode and comprising a plurality of separated electrically interconnected conductive vanes individually intersecting a median plane through said vanes at an acute angle and collectively having a projected area on said axis substantially coextensive with said predetermined projected area.

19. An electrostatic-deflection electrode for a beam deflection tube comprising a plurality of electrically interconnected separated control portions each substantially tangent to rays originating from a common point.

References Cited in the file of this patent

UNITED STATES PATENTS

| Number | Name | Date |
|---|---|---|
| 2,060,770 | Hansell | Nov. 10, 1936 |
| 2,161,437 | Sprague et al. | June 6, 1939 |
| 2,308,391 | Roberts | Jan. 12, 1943 |
| 2,416,914 | Eaton | Mar. 4, 1947 |
| 2,464,562 | Diemer | Mar. 15, 1949 |